United States Patent Office 3,127,444
Patented Mar. 31, 1964

3,127,444
ANTI-CAKING AGENT AND COMPOSITION
William F. Tousignant and Wesley J. Tacey, Midland, Mich., assignors to The Dow Chemical Company, Midland, Mich., a corporation of Delaware
No Drawing. Filed Oct. 30, 1961, Ser. No. 148,703
4 Claims. (Cl. 260—539)

This invention is concerned with the novel method for preventing the caking of finely divided water-soluble organic products and is particularly directed to such a method and composition employing ligno-sulfonates.

In accordance with the present invention, it has been discovered that the incorporation of small amounts of metal ligno-sulfonates in water-soluble organic compositions, subject to caking, results in products having excellent flowability and little or no tendency to caking even after standing for long periods of time. In a specific embodiment of the invention, it has been found that a composition comprising a small amount of alkali metal ligno-sulfonates or alkaline earth metal ligno-sulfonates in intimate mixture with an alkali metal salt of α,α-dichloropropionic acid displays unusual properties as regards flowability and lack of caking on standing.

The phenomenon of caking is well known in the art although the mechanism thereof is not completely understood. As employed in the present specification and claims, the term "caking" refers to the bonding together of the particles of a particulate solid under its own weight in a container and thus refers to the familiar phenomenon commonly observed, as for example, in fertilizers when exposed to moisture or in brown sugar when the latter is allowed to become over-dry. This use of the term, caking, is in contrast to the packing of such particulate solids brought about by pressure, as when a sack of material is placed at the bottom of a pile of such sacks in storage.

In carrying out the invention, the alkali metal or alkaline earth metal ligno-sulfonate is incorporated in the organic material in any convenient and suitable fashion. Thus, the metal ligno-sulfonate is intimately admixed by mechanical means such as grinding or comminuting with the organic product. Alternatively, an alcohol solution of the metal ligno-sulfonate is sprayed on the finely divided organic material and the resulting product dried. In another method, the metal ligno-sulfonate and organic product are mixed together in water or an organic liquid such as alcohol and the resulting mixture dried to obtain the desired product. In a convenient method of operation, an aqueous solution of the metal ligno-sulfonate is mixed with an aqueous solution of the organic product and the resulting mixture is dried and comminuted, pulverized or pelleted to produce the desired composition. In a convenient operation, good results are obtained when the aqueous solution of the metal ligno-sulfonate is mixed with a relatively concentrated aqueous solution of the organic product and the resulting mixture is then spray dried by conventional techniques. Suitably organic materials include the alkali metal chloroalkanoates containing from 2 to 5 carbon atoms, inclusive.

The amount of the metal ligno-sulfonate to be employed will vary, depending upon the particular organic product treated and the results desired. Good results have been obtained when employing at least 0.1 percent by weight of the metal ligno-sulfonate based on the weight of the dry composition produced, the weight of the dry mixture of metal ligno-sulfonate and organic product. The metal ligno sulfonate is usually employed in amounts of from 0.1 to 5 percent or more by weight of the combined weight of the metal ligno-sulfonate and organic product. The metal ligno-sulfonate can be employed in amounts up to 10 percent or more by weight. However, the employment of a large excess of the metal ligno-sulfonate is undesirable from the standpoint of economy. Any alkali metal or alkaline earth metal ligno-sulfonate can be employed such as, for example, the barium, calcium, beryllium, magnesium, lithium, sodium, and potassium ligno-sulfonates. However, for economic reasons, it is generally preferred to employ the barium, calcium or sodium ligno-sulfonates.

The metal ligno-sulfonates are prepared from the spent sulfite liquor obtained in the preparation of paper stock from wood. In one method of separating the desired ligno-sulfonate from other ingredients of spent sulfite liquor, a polyalkylene polyamine such as triethylenetetraamine, tetraethylenepentamine and higher polyalkylene-polyamines and the like or a mixture of such polyamines is added to spent sulfite liquor to precipitate a complex of the polyamine with the ligno-sulfonic acids from said liquor. The resulting precipitate is separated from the sulfite liquor, washed with water and redissolved in an aqueous alkaline earth metal or alkali metal hydroxide solution to produce a solution of the metal ligno-sulfonate suitable for use in accordance with the invention.

In a preferred embodiment of the invention, the metal ligno-sulfonate such as the sodium or calcium ligno-sulfonates are admixed with an aqueous solution of an alkali metal 2,2-dichloropropionate and the resulting solution is dried to produce an alkali metal 2,2-dichloropropionate composition as a dry solid having good flowability characteristics and having little or no tendency to cake on standing.

The following examples illustrate the invention but are not to be construed as limiting the same.

Example 1

To 3500 milliliters of calcium-base, spent sulfite liquor, obtained from the pulping of softwood and containing 10.2 percent by weight of solids, was added 42 grams of aqueous polyethylenepolyamine (67 percent by weight solids) diluted to 250 milliliters with water. The polyethylenepolyamine employed was a polymeric product produced by reacting equimolar proportions of commercial diethylenetriamine and ethylene chloride. The mixing of the above reactants produced a precipitate and the latter was separated by filtration, washed several times with water and dried to yield 120 grams of dried polyamine ligno-sulfonate complex as a product. 100 grams of this product was dissolved in a mixture of 7.4 grams of sodium hydroxide and 276 grams of water to produce a solution containing 28 percent by weight of sodium ligno-sulfonate. This solution was employed in subsequent operations.

Example 2

A solution of sodium 2,2-dichloropropionate obtained from a manufacturing process contained 41.3 percent by weight solids and had a specific gravity of 1.246. To 1000 milliliters of this solution of sodium 2,2-dichloropropionate was added 7.7 grams of an alkylarylpolyoxyethylene wetting agent and 9.13 grams of the 28 percent by weight solution of sodium ligno-sulfonate prepared in Example 1. This operation produced a solution containing 0.5 percent by weight of sodium ligno-sulfonate based on the weight of 2,2-dichloropropionate solids in the solution. Thereafter, the pH of the solution was adjusted to a value of 6 by the addition of aqueous 15 percent sodium hydroxide solution and the resulting mixture was fed into a Nerco Niro Portable Spray Drier. The drier was adjusted to operate with an inlet temperature of 350°–400° C., an outlet temperature of 100° C. and a feed rate of 50 milliliters per minute. The dried product was removed from the drier as a free-flowing dry powder. This dry powder product was stored for a period of two weeks and was found to be substantially free of caking.

In an exactly similar fashion, a further portion of the sodium 2,2-dichloropropionate solution was dried except that no ligno-sulfonate was added thereto. The dry product produced had relatively poor flowability and a lower bulk density than the product prepared above and became lumpy due to caking after only one day's standing.

*Example 3*

Further portions of the sodium 2,2-dichloropropionate solution as employed in Example 2 were mixed with varying amounts of sodium ligno-sulfonate and dried in the spray drier employing a feed rate of 20 milliliters per minute under the temperature conditions of Example 2. The amounts of ligno-sulfonate anti-caking agent employed and results obtained are summarized in the following table:

| Percent sodium ligno-sulfonate: | Observations on dried product |
|---|---|
| None | Very lumpy after 1 day's standing. |
| 0.1 | No caking apparent after 2 weeks. |
| 0.25 | Very good product, no caking after 2 weeks. |
| 1.0 | Flows like talcum powder, did not cake or form lumps after 2 weeks. |

In addition to the improvement in flowability and lack of caking, the bulk density of the dried material containing sodium ligno-sulfonate also increased as compared to the same product dried without the sodium ligno-sulfonate anti-caking agent.

These same desirable results were obtained when Marasperse C was employed instead of the sodium ligno-sulfonate prepared in Example 1. Marasperse C is a commercial calcium ligno-sulfonate product. In such operations, a solution of sodium 2,2-dichloropropionate containing 41.3 percent by weight of solids and having a specific gravity of 1.246 was obtained from a manufacturing process. To 1000 milliliters of this solution was added 7.7 grams of an alkylarylpolyoxyethylene wetting agent and 5.15 grams of Marasperse C. This operation produced a solution containing 1.0 percent by weight of calcium ligno-sulfonate based on the weight of 2,2-dichloropropionate solids in the solution. Thereafter the pH of the solution was adjusted to a value of 6 by the addition of aqueous 15 percent sodium hydroxide solution and the resulting mixture was fed into a Nerco Niro Portable Spray Drier. The drier was adjusted to operate with an inlet temperature of 350°–400° C., an outlet temperature of 100° C. and a feed rate of 50 milliliters per minute. The dried product was removed from the drier as a free-flowing dry powder. This dry powder product was stored for a period of 21 months and was found to be substantially free of caking.

In an exactly similar fashion, a further portion of the sodium 2,2-dichloropropionate solution was dried except that no ligno-sulfonate was added thereto. The dry product produced had relatively poor flowability and became lumpy due to caking after only one day's standing.

Similarly desirable results are obtained when employing potassium and barium ligno-sulfonates and such commercial sodium ligno-sulfonates as Polyfon F and T, Indulin C and Marasperse CB, CE and N. Further representative water soluble organic products which are benefited as regards improvement in flowability and prevention of caking by the incorporation of alkali metal and alkaline earth metal ligno-sulfonates include the alkali metal chloroalkanoates such as potassium dichloroacetate, sodium monochloro and trichloroacetates, sodium $\alpha,\alpha,\beta$-trichloropropionate, potassium $\beta$-chloropropionate, sodium $\alpha,\alpha$-dichlorobutyrate, sodium $\alpha,\beta$-dichloropropionate, sodium $\alpha,\alpha$-dichloroisovalerate, sodium $\alpha$-chlorobutyrate and the like. Preferred water soluble organic products are the alkali metal chloroalkanoates wherein chlorine occupies the $\alpha$- and $\beta$-positions on the alkanoate moiety.

This application is a continuation-in-part of our former application Serial No. 796,286, filed March 2, 1959, and now abandoned.

We claim:

1. A composition comprising from 0.1 to 10 percent by weight of a metal ligno-sulfonate in admixture with a water soluble organic product, the metal ligno-sulfonate being selected from the group consisting of the alkali metal ligno-sulfonates and alkaline earth metal ligno-sulfonates and the organic product being an alkali metal salt of a chloroalkanoic acid containing from 2 to 5 carbon atoms, inclusive.

2. A composition claimed in claim 1 wherein the ligno-sulfonate is calcium ligno-sulfonate and the organic product sodium $\alpha,\alpha$-dichloropropionate.

3. A composition claimed in claim 1 wherein the ligno-sulfonate is sodium ligno-sulfonate and the organic product sodium $\alpha,\alpha$-dichloropropionate.

4. A composition claimed in claim 1 wherein the ligno-sulfonate is calcium ligno-sulfonate and the organic product sodium $\alpha,\alpha$-dichlorobutyrate.

References Cited in the file of this patent

UNITED STATES PATENTS

| 2,685,494 | Marnon | Aug. 3, 1954 |
| 2,721,840 | Lee | Oct. 25, 1955 |

UNITED STATES PATENT OFFICE
CERTIFICATE OF CORRECTION

Patent No. 3,127,444                 March 31, 1964

William F. Tousignant et al.

It is hereby certified that error appears in the above numbered patent requiring correction and that the said Letters Patent should read as corrected below.

Column 4, line 28, for "10" read -- 1 --.

Signed and sealed this 22nd day of September 1964.

(SEAL)
Attest:

ERNEST W. SWIDER
Attesting Officer

EDWARD J. BRENNER
Commissioner of Patents